March 22, 1966   R. D. SCHULTHEISS   3,242,023
METHOD AND APPARATUS FOR PRODUCING EXTRUDED PLASTIC NET
Filed May 20, 1959   2 Sheets-Sheet 1

INVENTOR.
RALPH D. SCHULTHEISS
BY
ATTORNEY

March 22, 1966 R. D. SCHULTHEISS 3,242,023

METHOD AND APPARATUS FOR PRODUCING EXTRUDED PLASTIC NET

Filed May 20, 1959 2 Sheets-Sheet 2

INVENTOR.
RALPH D. SCHULTHEISS
BY Ramon A. Klitzke
ATTORNEY

United States Patent Office 3,242,023
Patented Mar. 22, 1966

3,242,023
METHOD AND APPARATUS FOR PRODUCING EXTRUDED PLASTIC NET
Ralph D. Schultheiss, Springdale, Conn., assignor to Union Carbide Corporation, a corporation of New York
Filed May 20, 1959, Ser. No. 814,474
9 Claims. (Cl. 156—167)

This invention relates to a method and apparatus for producing extruded plastic net. More particularly, this invention relates to a method and apparatus for producing an extruded net comprised of polymeric fibers bonded to each other.

It is known to extrude polymeric materials in the shape of a fiber or a cylindrical tube out of a metal die. Straight thermoplastic sheets have also been extruded and various other cross sectional shapes can be produced. It is also known to extrude plastic materials out of dies and then work the materials by stretching, stamping, cutting or spinning so as to produce various shapes and forms of varying strength and usefulness. Attempts to produce an extruded shape having open spaces therein effected during the extrusion without the need for any auxiliary working or processing have, however, not proved satisfactory. More specifically, an efficient means of producing a plastic net of joined fibers in one extrusion step, as is accomplished by the present invention, has never been devised.

It is also known to produce fibers by wet spinning through fine orifices. As in the case of melt extruded fibers, no efficient method has been advanced for making such fibers into nets at the time of spinning, there being required, in all methods known to the art, the need of additional working and weaving to produce fabrications from such fibers.

It is an object of this invention to provide a method for producing a net of polymeric fibers by extruding said fibers without the need of additional processing steps.

It is also an object of this invention to provide a method for producing a net of polymeric fibers bonded together near the point of extrusion.

A further object of the invention is to provide an apparatus for producing a polymeric net.

Another object of this invention is to provide an apparatus for bonding extruded polymeric fibers together near the point of extrusion.

It is a further object of this invention to provide a method for stretching and orienting polymeric fibers in a heated bath by drawing them over a mandrel.

Other objects and advantages of the invention will become apparent from the following description and appended claims.

According to the present invention thermoplastic fibers are extruded from oscillating nozzles which alternately converge and diverge so that plastic fibers extruded therefrom alternately contact each other and are then separated. Such contact is made at a point near the point of extrusion so that contacted fibers are bonded to each other.

In the preferred embodiment of the invention plastic fibers are melt extruded from nozzles arranged in a circle so that all the fibers are extruded in a single layered cylinder. The fibers from adjacent nozzles flow together when the nozzle tips converge and separate when the nozzle tips diverge. When they flow together, the fibers are securely bonded together. Upon such bonding, a strong, attractive plastic cylindrical net is produced having adjacent fibers attached to each other at some angle, depending on the speeds of oscillation of the nozzles and the rate of extrusion. It is preferable to extrude the fibers in a downward direction so that they can flow together more readily but the invention will operate with extrusion upwardly or in other directions, also.

The invention will now be described in greater detail by reference to the drawings, in which.

Figure 1:
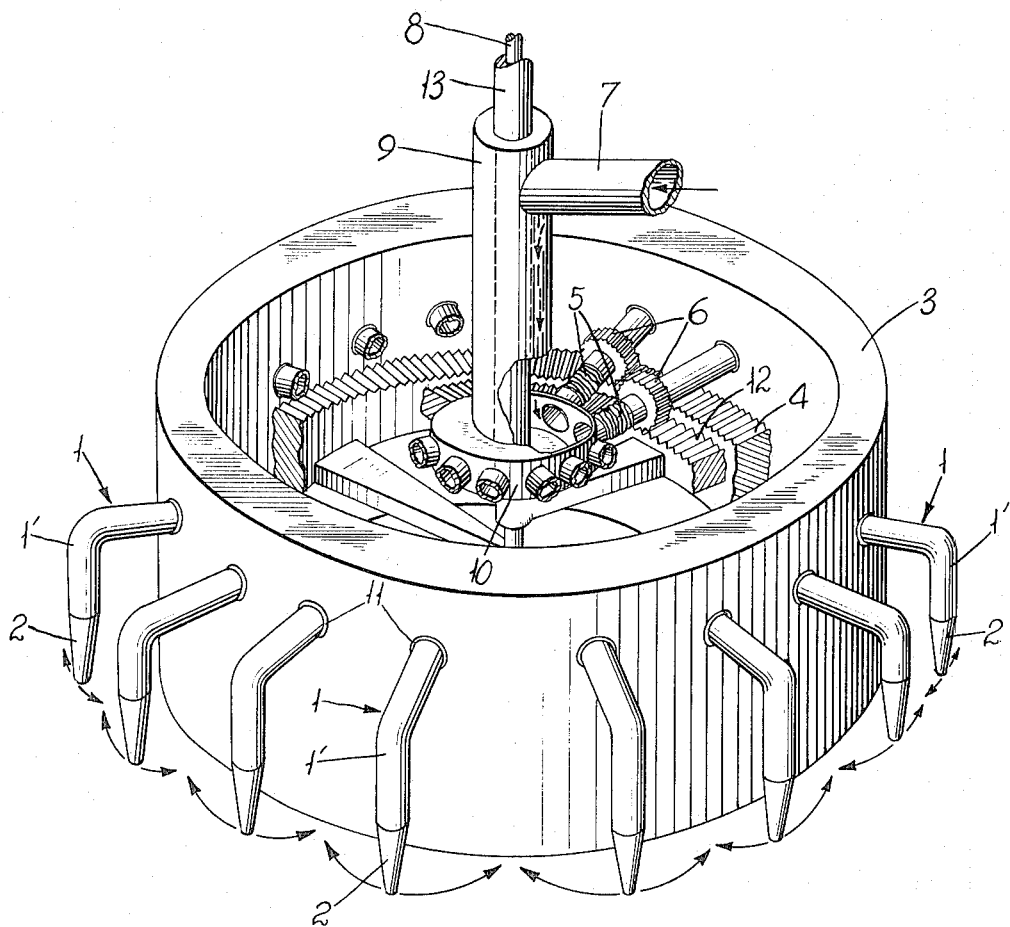
FIG. 1 is an isometric view of the nozzle extrusion apparatus for use in the present invention.
Figure 2:
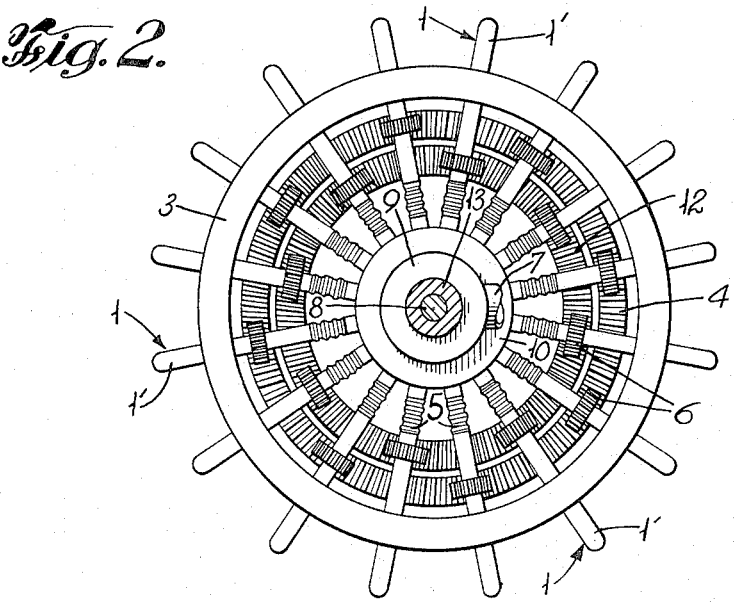
FIG. 2 is a plan view of the apparatus of FIG. 1.

Referring now to FIGS. 1 and 2, the apparatus comprises an annular support 3 having apertures therein in which are inserted bearings 11. These apertures may be equally spaced around the annular member 3 and may all lie in the same horizontal plane. Alternately, the holes could be spaced at various points on the annular member to provide a great variety of net patterns.

Extrusion nozzles 1 are each comprised of a tube 1, a nozzle tip 2, which is preferably removable, a gear 6 and a bellows section 5. Each of the tubes 1 is attached to the manifold 10, which is preferably of a rigid nature. Ring gears 4 and 12 rotate reciprocally and in opposite directions so as to impart reciprocating motions to the nozzles 2. This is accomplished by contacting alternate ring gears 6, attached to adjacent nozzles 1, with ring gears 4 and 12. The bellows 5, on each tube, permits partial rotation of the tube while allowing fluid plastic to flow therein.

Ring gears 4 and 12 are attached to shafts 8 and 13 respectively, and are rotated in accordance with the rotation of these two shafts. Shaft 13 forms an annulus with the pipe 9, through which the liquid plastic flows to the manifold 10. Liquid plastic flows into the pipe 9 from inlet 7.

Figure 3:
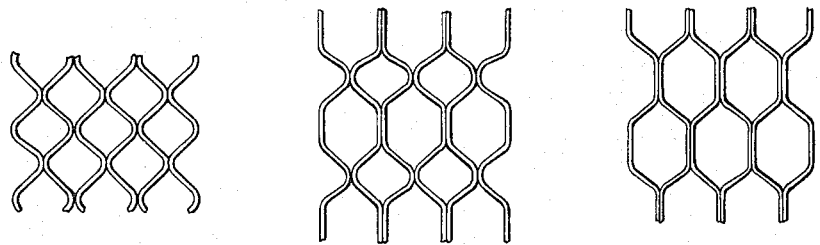
FIG. 3 shows various net patterns which may be produced by the method of this invention.

By adjusting the timing sequence of the reciprocating movement of the ring gears 4 and 12, a large variety of plastic net patterns can be produced as shown in FIG. 3. Any thermoplastic material may be used in this invention which is extrudable in the form of a fiber. The plastic should be of such a nature that fibers will adhere when they are contacted as the reciprocating nozzles coverage. It is preferable that the fibers be not more than about one-quarter inch in diameter. They can be circular, eliptical or rectangular in cross-sectional shape.

Since as indicated above all the fibers are extruded in a single layered cylinder, the resulting tubular net has a wall composed, in cross-section, of but one layer or stratum of the fibers, i.e., each net fiber is interposed substantially between the adjacent fibers, on either side thereof, which it contacts, as indicated, for example, in FIGURES 1, 2 and 3. The resulting net thus presents a relatively smooth net surface on both sides thereof.

Following extrusion the net can be further worked or stretched and may be cut into a great variety of shapes and sizes. For example, bonded polymeric net made by this invention may be passed into a heated bath in which it may be stretched and oriented so as to increase its shape. A mandrel may be located in this bath over which the cylindrical, bonded net is passed and this mandrel can be some diameter greater than the extruded net depending upon the amount of stretching desired. The net may then be withdrawn from the mandrel at a greater rate than it initially contacts it so as to stretch it longitudinally while being stretched axially by the action of the mandrel. The bath liquid performs two functions. It provides heat for maintaining the polymeric material at its optimum orienting temperature and it provides lubrication between the mandrel and the net so the net may pass smoothly thereover.

In the case of some polymers, such as polyethylene telephthalate or poly m-xylylene adipamide, oriented polymeric net obtainable from the above orientation step is shrinkable at relatively low temperatures. If it is desired to crystallize or heat stabilize the net, i.e., render it substantially non-shrinkable up to temperatures of about 120° C., the oriented net can be held at its diameter by passing it over a second mandrel having a diameter about equal to the diameter of the oriented net to prevent shrinkage while simultaneously heating it to a temperature in excess of the second order transition temperature of the polymeric fibers but below the melting point thereof. This temperature is preferably that at which the crystallization rate is maximum.

For use in this invention, representative heats of extrusion, orientation and heat stabilization for various fibers are given in Table 1 below. It is emphasized that these temperatures are mere approximations and in no way limit the scope of this invention.

*Table 1*

| Material | Extrusion Temp., °C. | Orientation Temp., °C. | Heat Stabilization Temp., °C. |
|---|---|---|---|
| Polyethylene | 180–250 | 18–108 | 100 |
| Polyethylene DYNK [1] | 180–190 | 24 | |
| High density polyethylene | 200–250 | 95–100 | 100 |
| Polystyrene | [2] 240–280 | 135 | 90 |
| Vinyl chloride and its copolymers. | [3] 150–170 | 100 | 100 |
| Polypropylene | 200–250 | 115–135 | 100 |

[1] Polyethylene DYNK is produced by Union Carbide Plastics Company under high pressure and at an elevated temperature in the presence of a free-radical oxygen catalyst. It has a melt index as determined by the method described in ASTM D1238–52T of about 0.3 dgm/min. and a density of about 0.920 grams per cubic centimeter. The heat stabilization step should always be done at a lower temperature than the orientation temperature.
[2] Nominal 275° C.
[3] Nominal 160° C.

To obtain good orientation, low density polyethylene can be stretched to about 500% to 550% of its original size while high density polyethylene can be stretched to about 1000% of its original size. In general, the greater amount of stretching, the greater will be the strength obtained. The extruded fibers when initially extruded and suddenly cooled, are in the amorphous state. The amorphous fibers are brittle and have low tensile strength. No appreciable crystallinity can be observed by means of X-ray diffraction analysis or by density measurements. The fibers cannot be readily drawn at room temperature and have very little shrinkage when relaxed and subjected to high temperatures.

The amorphous fibers can be converted to tough, highly shrinkable fibers by heating and biaxially stretching and orienting in the temperature range above the second-order transition temperature but below the temperature at which the polymer will tend to thin out without appreciable molecular orienation, i.e., at temperatures near the melting point of the resin. By second-order transition temperature is meant that temperature at which a discontinuity is noted in the first derivative of a primary thermodynamic quantity with respect to temperaure, and is unaccompanied by the usual latent heat which appears in first-order transition temperatures. It is related to polymer fluidity and yield temperature. Some of the thermodynamic properties that can be observed in determining the second-order transition point are: specific volume, specific heat, density, index of refraction and modulus of elasticity.

The polymer composition and rate of heating affect the observed second-order transition temperature. The optimum orientation temperature and heating rate can be readily determined by simple empirical tests.

It is preferred to pass the net downwardly during the orientation stage to allow for uniform heating and stretching, although other directional movement such as downward, horizontal or angularly disposed will also produce the desired result. It is to be understood, of course, that the orientation of the net may be done in a separate step which can be combined with the step of extruding the net.

Oriented polyethylene net, obtained by the process herein described and subsequently oriented at temperatures about its second-order transition temperature, is clear, transparent, tough and shrinkable. It is also heat sealable. Biaxially orineted poly m-xylylene adipamide net can also be oriented above its second-order transition temperature of about 68° C. to produce clear, tough net.

The oriented, shrinkable nets are admirably suited for use wherein a skin tight fit around an irregularly shaped object is desired. The item to be packaged can be inserted into a loose fitting bag made of the oriented net and then the net can be heated above the second-order transition temperature to cause the net to shrink to conform to the contents of the packages.

Polyethylene net that has been extruded and biaxially stretched and oriented according to this invention will shrink almost instantly upon immersion in hot water at temperatures about 125° F.

Where it is desired to provide net dimensionally stable to high temperatures, polyethylene net can be heated to temperatures above its second-order transition temperature but below the temperature at which the fiber begins to lose molecular orientation and is crystallized under tension. This process will now be described in detail.

When molten polyethylene extruded in the form of fibers is rapidly cooled to room temperature, amorphous fibers are obtained which show very little tendency to crystallize over long periods of time. The amorphous net when heated to about its second-order transition temperature readily softens and changes from an inelastic substance to a rubbery, easily deformable and drawable material. In this drawable state, the polyethylene fibers may be easily stretched by the application of relatively small forces to yield highly oriented fibers. Even at its second-order transition temperature, the polyethylene crystallizes slowly.

Crystallization is readily initiated in oriented polyethylene fibers as they are exposed to high temperatures. The rate of crystallization increases as the temperature rises to about 180° F. At temperatures above about 180° F. the rate of crystallization will tend to decrease. Also, at higher temperatures, viz. near the melting point, the net begins to lose some of the molecular orientation which had been imparted at the lower temperatures.

As has already been described, the oriented net is heat stabilized by heating in a bath while passing it over a mandrel except that the net is not stretched but is merely maintained at its diameter. Heat is applied to the net only while it is being held at its diameter by the mandrel, as it would shrink if heated while not passing thereover.

The crystallized, biaxially oriented net is clear, tough, transparent, and dimensionally heat stable at temperatures up to its melting point, depending upon degree of crystallization obtained.

The process herein described can be used to control the degree of shrinkage of the polyethylene net. The time and temperature to which the biaxial oriented net is subjected during the stabilization stage will determine the degree of shrinkage.

While this embodiment of the invention has been described with particular reference to polyethylene, it is to be understood that the invention is not restricted thereto.

Structures of the same nature as those obtained by the melt extrusion and subsequent cooling of a plastic material according to the description given, may be also produced by employing viscose, a cuprammonium solution, or similar coagulable liquids extruded through an apparatus similar to that already described directly into a coagulating liquid.

For example, viscose of the composition and salt index commonly employed in the manufacture of rayon, may be pumped into the die and thence continuously extruded directly through small holes into a rayon spinning bath which contains about 10 parts by weight of sulfuric acid and about 18 parts of sodium sulfate with about 72 parts of water. Small amounts of other commonly employed agents such as glucose, two parts, and/or zinc sulfate, one part, may be added to the bath and filaments substantially greater in cross-section than the coarsest commercial rayon yarn may be produced. Substantial amounts of ammonium sulfate may also be added to coagulating bath.

The net-like structures issuing from the die may be drawn away at speeds substantially exceeding that at which the jets of viscose issue from the die, whereby extension and greater strength of the structure may be achieved.

A further embodiment of this invention lends itself to the production of thread, cord or rope. Polymeric fibers are melt extruded as hereinbefore described except that several layers of concentric cylindrical nets are produced instead of only two. Such layers are produced by several pieces of extrusion apparatus extruding over each other. The concentric cylindrical nets comprise fibers arranged in circles of much smaller diameters than those described and all of the individual nets can be drawn together through a ring so as to unite them into a strong cord or rope of polymeric material. After the nets are brought together they can be stretched so as to form a strong rope of composite layers. The cord can then be oriented and heat stabilized as described above except that no mandrel will be used at the interior of the rope.

Any monofilament-forming, extrudable material can be used in this invention. Examples of such materials are:

Cellulosics
Polyethylene
Polypropylene
Nylon
Polyethylene terephthalate
Vinylidene resins and copolymers
Copolymers of ethylene and other olefins
Polyacrylonitrile and its copolymers
Vinyl chloride and its copolymers
Vinyl acetate and its copolymers
Polystyrene
Polyoxyethylene
Poly carbonate
Poly vinyl alcohol The net of this invention readily lends itself to a great variety of uses. It can be used in its cylindrical shape for covering articles such as bottles or the cylinder can be slit so as to produce a flat piece of netting which then can be cut to any desired shape or size.

It is intended that the invention disclosed herein not be limited by the foregoing description but only by the scope of the appended claims.

What is claimed is:

1. A method for producing a plastic net comprising concurrently extruding a multiplicity of plastic fibers in a single layered cylinder; periodically contacting and separating adjacent fibers in said single layered cylinder while said fibers are in the tacky state so as to bond said adjacent fibers together at the points of contact and form a tubular plastic net having a wall composed of a single layer of said fibers; and cooling said tubular plastic net to set the plastic material thereof.

2. The method of claim 1 wherein adjacent fibers are bonded together by oscillating said fibers so as to alternately contact and separate adjacent fibers within said single layered cylinder.

3. The method of claim 1 wherein the temperature of the net thus formed and set is adjusted to an orientation temperature above the second order transition temperature of the plastic material thereof and said net is stretched in the direction of extrusion.

4. A method for producing a plastic net comprising concurrently extruding a multiplicity of similar plastic fibers in a single layered cylinder, each fiber being at the same radial distance from the center of said cylinder; periodically contacting and separating adjacent fibers in said cylinder while said fibers are in the tacky state so as to bond said adjacent fibers together at the points of contact, and form a cylindrical plastic net; and cooling said cylindrical plastic net to set the plastic material thereof.

5. A method for producing a plastic net comprising concurrently extruding a multiplicity of similar plastic fibers in a single layered cylinder, each fiber being at the same radial distance from the center of said cylinder; oscillating said fibers so as to alternately contact and separate adjacent fibers within said cylinder so as to bond said adjacent fibers together at the points of contact, and form a smooth cylindrical plastic net; and cooling said cylindrical plastic net to set the plastic material thereof.

6. A method for producing a plastic net comprising concurrenlty extruding a multiplicity of similar plastic fibers in a single layered cylinder, each fiber being at the same radial distance from the center of said cylinder; periodically contacting and separating adjacent fibers in said cylinder while said fibers are in the tacky state so as to bond said adjacent fibers together at the points of contact, and form a cylindrical plastic net; and cooling said cylindrical plastic net to set the plastic material thereof; adjusting the temperature of said net to an orientation temperature above the second-order transition temperature of the plastic material thereof; and stretching said net at said orientation temperature in the direction of extrusion.

7. Apparatus for producing a plastic net comprising a multiplicity of extrusion nozzles arranged in a single circle and adapted to extrude plastic fibers in a single cylinder substantially perpendicular to the plane of said circle; means for supplying said nozzles with molten plastic material; and means for oscillating said nozzzles so that adjacent nozzle tips periodically converge and diverge, thereby periodically contacting and separating adjacent fibers in said cylinder so as to form a smooth cylindrical plastic net; and means for cooling said cylindrical plastic net to set the plastic material thereof.

8. Apparatus for producing a plastic net comprising a multiplicity of extrusion nozzles arranged in a single circle and adapted to extrude plastic fibers in a single cylinder substantially perpendicular to the plane of said circle; means for supplying said nozzles with molten plastic material; means for oscillating said nozzles so that adjacent fibers extruded therefrom are alternately contacted and separated so as to form a smooth cylindrical plastic net; and means for cooling said cylindrical plastic net so as to set the plastic material thereof.

9. Apparatus for extruding a netting of plastic material comprising, in combination, a source of plastic material; a hollow die head connected to said source to receive said plastic material; a plurality of nozzles, at least some of which are swingably mounted on the die head and all of which are adapted to receive the plastic material from the interior of said die head, all of said nozzles being adapted to discharge the plastic material from their discharge ends outside the die head as continuous extruded running lengths; pairs of said nozzles being constructed and arranged to contact each other at their outer discharge ends at one end of the arc of swing and during such contact to weld two adjacent plastic lengths together as said plastic lengths are extruded from contacting nozzles; and power means to swing said swingably mounted nozzles back and forth according to a predetermined time sequence, wherein the nozzles are arranged in a circular series with their discharge openings in the same general plane, and all the nozzles are swingable, every other nozzle being swingable in one direction, the remainder of the nozzles being simultaneously swingable in the other direction, and all the nozzles then simultaneously reversing their previous respective swings.

References Cited by the Examiner

UNITED STATES PATENTS

| | | | |
|---|---|---|---|
| 2,522,527 | 9/1950 | Manning | 18—8 |
| 2,689,199 | 9/1954 | Pesce | 154—46 |
| 2,738,298 | 3/1956 | David et al. | 154—53.6 |
| 2,842,472 | 7/1958 | Hardstein | 154—46 |
| 2,895,535 | 7/1959 | Ono | 154—1.7 |
| 2,919,467 | 1/1960 | Mercer | 18—12 |
| 2,985,220 | 5/1961 | Fry | 154—1.7 |

FOREIGN PATENTS

| | | |
|---|---|---|
| 200,333 | 10/1958 | Austria. |
| 182,336 | 3/1950 | Japan. |

OTHER REFERENCES

Grove: Webster's Third New International Dictionary, Springfield, Mass., G. & C. Merriam Co., 1963.

Sears and Zemansky, University Physics, Cambridge, Mass., Addison-Wesley Publishing Co., 1955, p. 165 relied on.

ALEXANDER WYMAN, *Primary Examiner.*

WILLIAM J. STEPHENSON, CARL F. KRAFFT,
*Examiners.*